United States Patent
Roesser et al.

(10) Patent No.: US 11,678,427 B2
(45) Date of Patent: Jun. 13, 2023

(54) DISCHARGE DEVICE

(71) Applicant: Schunk Transit Systems GmbH, Wettenberg (DE)

(72) Inventors: Helmut Roesser, Ebsdorfergrund (DE); Peter Hoelscher, Treis (DE); Robert Noe' Castellanos, Giessen (DE); Juergen Spies, Langgoens (DE)

(73) Assignee: SCHUNK TRANSIT SYSTEMS GMBH, Wettenberg (DE)

( * ) Notice: Subject to any disclaimer, the term of this patent is extended or adjusted under 35 U.S.C. 154(b) by 216 days.

(21) Appl. No.: 16/982,688

(22) PCT Filed: Mar. 20, 2019

(86) PCT No.: PCT/EP2019/056977
§ 371 (c)(1),
(2) Date: Sep. 21, 2020

(87) PCT Pub. No.: WO2019/185420
PCT Pub. Date: Oct. 3, 2019

(65) Prior Publication Data
US 2021/0168922 A1 Jun. 3, 2021

(30) Foreign Application Priority Data
Mar. 27, 2018 (DE) ...................... 10 2018 107 260.0

(51) Int. Cl.
*H01H 47/00* (2006.01)
*H05F 3/00* (2006.01)
(Continued)

(52) U.S. Cl.
CPC .............. *H05F 3/02* (2013.01); *H02K 11/40* (2016.01)

(58) Field of Classification Search
CPC ...... H05F 3/02; H02K 11/40; H02K 2213/03; H01R 39/58
(Continued)

(56) References Cited

U.S. PATENT DOCUMENTS

| 4,739,208 A * | 4/1988 | Kimberlin | H01R 39/58 310/248 |
| 2006/0192676 A1* | 8/2006 | Vogt | G08B 13/08 340/522 |
| 2009/0229926 A1* | 9/2009 | Schaefer | F16D 66/025 701/70 |

FOREIGN PATENT DOCUMENTS

| CN | 204103677 U | 1/2015 |
| DE | 202011 106 899 | * 10/2011 |

(Continued)

*Primary Examiner* — Jared Fureman
*Assistant Examiner* — Lucy M Thomas
(74) *Attorney, Agent, or Firm* — Dickinson Wright PLLC; Andrew D. Dorisio

(57) ABSTRACT

A discharge device for discharging electrostatic charges from a shaft includes a frame support having a first leg and a second leg and a contact strand for forming a contact surface with the shaft, a first end of the contact strand being clamped on the first leg and a second end of the contact strand being mounted so as to be displaceable on the second leg, a receiving means which is disposed on the frame support, the second end of the contact strand extending at least partly into the receiving means, and a switch, in particular a reed switch, which is disposed in the receiving means or in the contact strand and which is configured so as to be activated as a result of a displacement of the second end of the contact strand, said second end extending at least partly into the receiving means.

14 Claims, 3 Drawing Sheets

Figure 1:
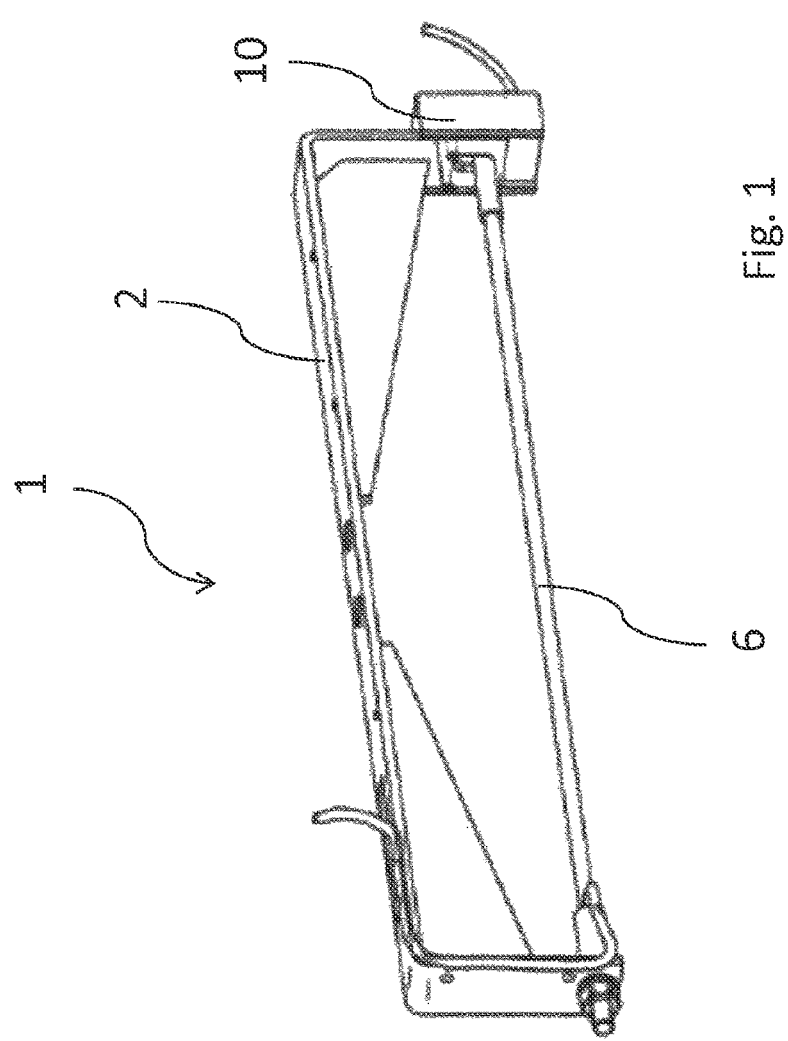

(51) Int. Cl.
*H05F 3/02* (2006.01)
*H02K 11/40* (2016.01)

(58) Field of Classification Search
USPC .......................................................... 361/220
See application file for complete search history.

(56) References Cited

FOREIGN PATENT DOCUMENTS

| | | |
|---|---|---|
| DE | 202011106899 U1 | 5/2012 |
| DE | 102015206520 A1 | 10/2016 |
| JP | S57122650 A | 7/1982 |
| JP | 2015019487 A | 1/2015 |

* cited by examiner

DISCHARGE DEVICE

FIELD OF THE INVENTION

The invention relates to a discharge device for discharging electrostatic charges from a shaft. The invention further relates to a device having a shaft and a discharge device.

BACKGROUND OF THE INVENTION

Discharge devices can be used for discharging electrostatic charges caused by friction effects or external impacts, such as lightning strikes. Furthermore, discharge devices of this kind can also be used for discharging electric charges from motor shafts of electric motors, said electric charges occurring in particular on three-phase motors as a result of a mutually induced electric current.

Providing a brush-shaped arrangement in which a grounding brush is disposed so as to be in sliding contact with a contact circumference of the shaft, said grounding brush often being produced using thin copper wires, is known for realizing discharge devices.

However, known grounding brushes having metallic bristles are subject to increased wear in the sliding contact with the contact partner or the shaft from which the charge is to be discharged. The contact strand will fail at a certain point in time as a result of increased wear.

It is therefore the object of the invention to propose a discharge device that can promptly detect when the contact strand of the discharge device reaches a defined state of wear.

SUMMARY OF THE INVENTION

The discharge device for discharging electrostatic charges from a shaft has a frame support having a first leg and a second leg and a contact strand for forming a contact surface with the shaft, a first end of the contact strand being clamped on the first leg and a second end of the contact strand being mounted so as to be displaceable on the second leg. Furthermore, the discharge device has a receiving means which is disposed on the frame support, the second end of the contact strand extending at least partly into the receiving means. The discharge device also has a switch, in particular a reed switch, which is disposed in the receiving means or in the contact strand and which is configured so as to be activated as a result of a displacement of the second end of the contact strand, said second end extending at least partly into the receiving means.

The switch is preferably a reed switch or a reed contact. The switch can also be a reed sensor. Preferably, the reed switch has ferromagnetic switching tongues which can move towards or away from each other when exposed to an external magnetic field. Thus, a reliable hermetically sealed switching element small in size is provided for fast switching operations.

"Activating" means closing or opening the switch, in particular reed switch. In other words, when the switch is closed, it changes from an open position to a closed position, whereas when it is opened, it changes from a closed position to an open position. In this context, a wear of the contact strand causes its displacement. In other words, the switch is configured so as to be activated as a result of a displacement of the contact strand, said displacement being caused by a wear of said contact strand.

Preferably, the contact strand is disposable tangentially to a contact circumference of the shaft in the frame support. A contact surface can preferably be formed between said contact strand and the contact circumference of the shaft when the contract strand is in a contact position. In particular, the contact strand is a strand or a cord. More preferably, the contact strand has a fiber arrangement composed of a plurality of carbon fibers.

The first end of the contact strand which is clamped on the first leg can be considered a fixed clamping or fixed bearing. The second end of the contact strand which is mounted in a displaceable manner on the second leg can be considered a floating bearing.

It is advantageous for the second end, which extends partly into the receiving means, to have a magnetic area when the switch is disposed in the receiving means. Thus, a magnetic field generated by the magnetic area is formed so as to be displaceable with respect to the switch. In other words, a magnetic field generated by the magnetic area can be displaced relative to the switch in order to activate the switch. Advantageously, a magnet can be disposed on the second end or in the area of the second end for this purpose. Furthermore, the magnet can alternatively at least partly enclose the second end.

As a result of the wear of the contact strand, the magnetic area of the contact strand can move away from the switch, causing the switch to open. In other words, a magnetic field moving away from the switch opens the switch. This occurs in particular when the switch is disposed in the displacement direction of the second end of the contact strand below the second end of the contact strand.

Alternatively, the magnetic area of the contact strand can also move towards the switch as a result of the wear of the contact strand, causing the switch to close. In other words, a magnetic field approaching the switch closes the switch. This occurs in particular when the switch is disposed in the displacement direction of the second end of the contact strand above the second end of the contact strand.

Furthermore, it is advantageous for the receiving means to have a magnetic area when the switch is disposed in the contact strand, in particular in the second end of the contact strand which extends partly into the receiving means. Thus, the switch is formed so as to be displaceable with respect to a magnetic field generated by the magnetic area. In other words, the second end of the contact strand can be displaced relative to a magnetic field generated by the magnetic area in order to activate the switch. Advantageously, a magnet can be disposed in the receiving means for this purpose. In this context, the switch can be disposed in the area of the second end of the contact strand which extends at least partly into the receiving means.

As a result of the wear of the contact strand, the switch disposed in the contact strand can move away from the magnetic area of the receiving means, causing the switch to open. In other words, a magnetic field moving away from the switch opens the switch. This occurs in particular when the magnetic area is disposed below the contact strand in the displacement direction of the second end of the contact strand.

Alternatively, the switch can also move towards the magnetic area as a result of the wear of the contact strand, causing the switch to close. In other words, a magnetic field approaching the switch closes the switch. This occurs in particular when the magnetic area is disposed above the contact strand in the displacement direction of the second end of the contact strand.

It is especially advantageous for the discharge device to have an optical or acoustic means which is connected to the switch, said means being configured in particular so as to be triggered as a result of an activation of the switch.

In this context, the means can be triggered when the switch is open. Alternatively, the means can also be triggered when the switch is closed. The means can generate an optical or visual or acoustic signal when triggered. For example, the optical means can be an illuminant, in particular a light bulb or an LED. The acoustic means can be a speaker, for example.

In order to ensure that the contact strand is easily guided, the second end of the contact strand can be guided through an opening of the second leg of the frame support.

Further advantageously, the opening is an oblong hole. Thus, a vertical displacement of the second end of the contact strand relative to the receiving means can easily be executed.

It is especially advantageous if the second end of the contact strand is displaceable in the receiving means relative to the longitudinal extension of the second leg. Thus, a relative displacement or relative shift of the second end of the contact strand towards the receiving means can be executed.

It is advantageous for the contact strand to be in contact with a first side of the opening of the second leg when in a starting position and to be in contact with a second side of the opening of the second leg when in the end position, said second side being disposed opposite the first side. A position of the contact strand in which the contact strand is free from wear can be considered the starting position. A position in which the contact strand shows signs of wear such that the contact strand and/or the discharge device must be replaced can be considered an end position of the contact strand.

It is especially advantageous for the switch to be configures so as to be activated as a result of a reduction of the initial cross-sectional area of the contact strand to at least 50%. Thus, it can easily be determined when the initial cross-sectional area is reduced to at least one half. Because of the geometric embodiment, meaning the shape, of the opening or the oblong hole, the displacement path of the second end can easily be set.

Furthermore, it is advantageous for the receiving means to be disposed externally on the second leg of the frame support. Thus, a space, in particular a cavity, for guiding or displacing the second end of the contact strand can easily be formed in the receiving means. The receiving means can be attached to the second leg by means of attachment means.

It is especially advantageous for the receiving means to engage at least partly around the frame support. Thus, the receiving means can easily be connected to the frame support.

The switch is preferably adhesively bonded or pressed into the receiving means. Thus, a fixed connection of the switch in the receiving means can easily be achieved.

The switch is preferably adhesively bonded, pressed or woven into the contact strand. Thus, a fixed connection of the switch in or within the contact strand can easily be achieved.

It is especially advantageous for the discharge device to have a means which is configured so as to apply a force to the frame support in the direction of the shaft. Thus, a release of the switch between the contact strand and shaft can easily be avoided. Preferably, the means is a tension spring or a compression spring.

The device according to the invention has a shaft and a discharge device, as described above.

BRIEF DESCRIPTION OF THE DRAWING FIGURES

In the following, preferred embodiments of the invention are further described by means of the drawings.

Figure 2:
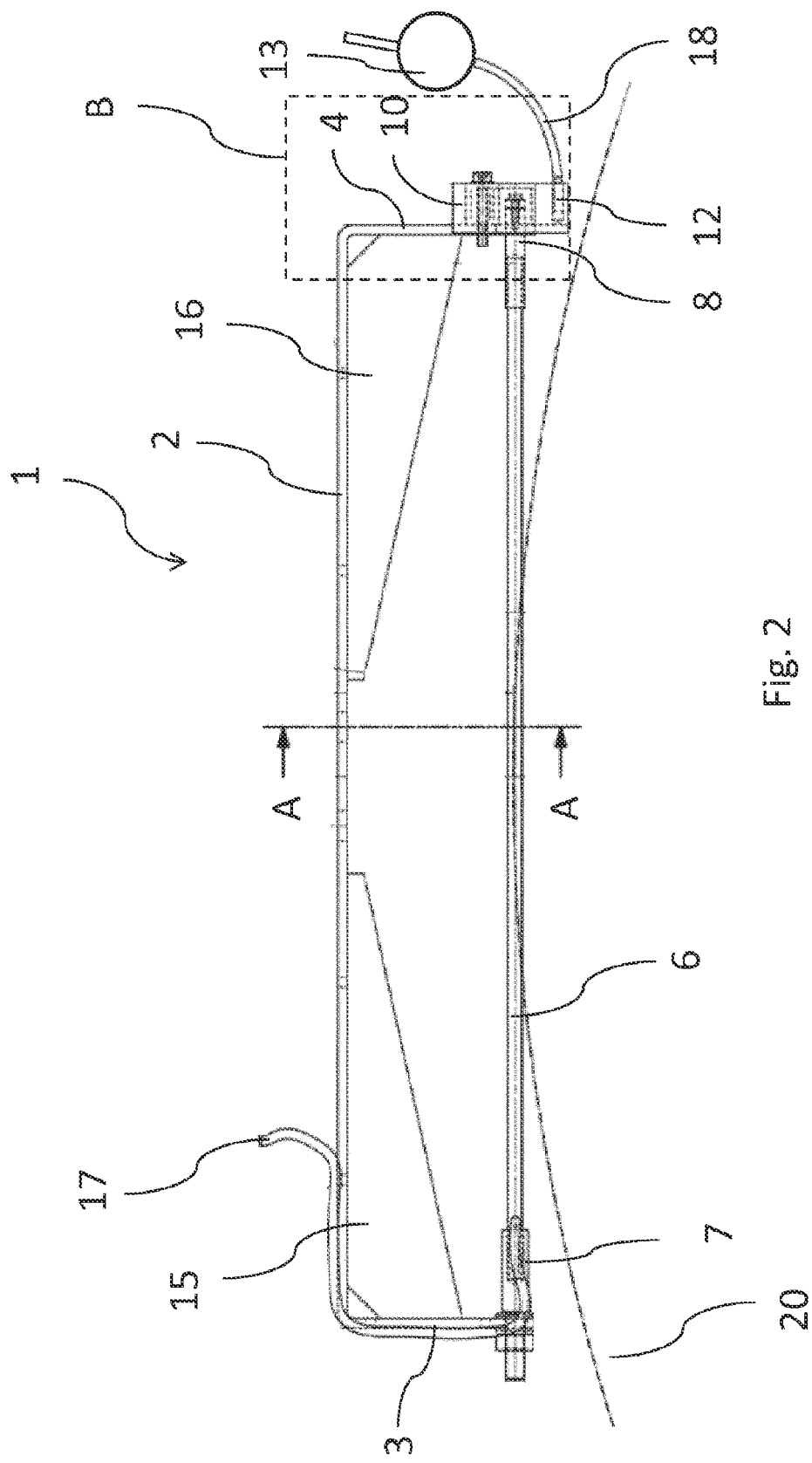
Figure 4:
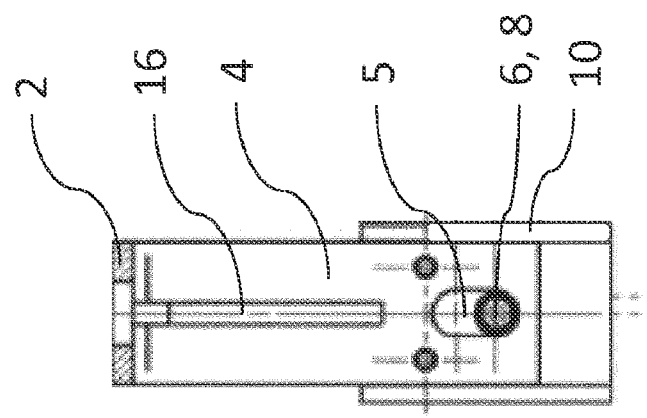
Figure 3:
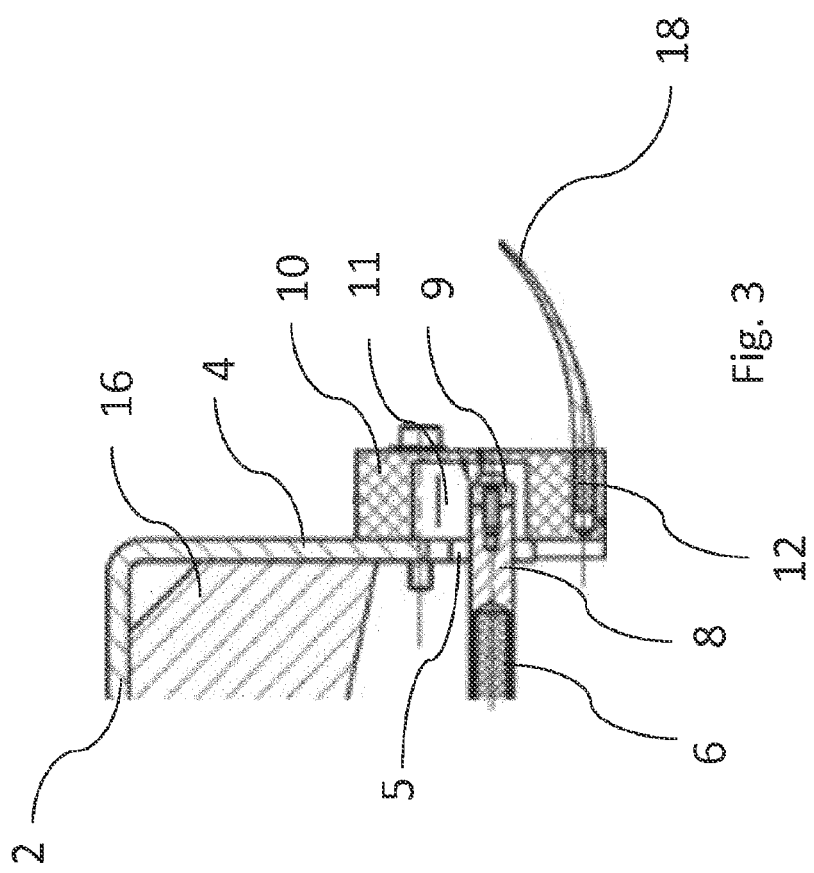

FIG. 1: is a perspective view of a discharge device;
FIG. 2: is the discharge device from FIG. 2 in a longitudinal view in contact with a shaft;
FIG. 3: is a Detail B of the discharge device from FIG. 2;
FIG. 4: is a cross section A-A through the discharge device from FIG. 2.

DETAILED DESCRIPTION OF THE INVENTION

FIG. 1 shows a discharge device 1 having a frame support 2, a contact strand 6 which is disposed on frame support 2 and a receiving means 10. Discharge device 1 serves for discharging electrostatic charges from a shaft 20.

As shown in particular in FIG. 2, discharge device 1 has frame support 2 having a first leg 3 and a second leg 4 and contact strand 6 for forming a contact surface with shaft 20. A first end 7 of contact strand 6 is firmly clamped on first leg 3. A second end 8 of contact strand 6 is mounted so as to be displaceable on second leg 4.

Second end 8 of contact strand 6 extends at least partly into receiving means 10. Furthermore, discharge device 1 has a switch which is formed as reed switch 12 and disposed in receiving means 10. Reed switch 12 is configured so as to be activated as a result of a displacement of second end 8 of contact strand 6, said second end 8 extending at least partly into receiving means 10. The displacement is a result of the wear of contact strand 2. As a result of this, second end 8 of contact strand 2 is displaced correspondingly with respect to receiving means 10 and thus with respect to reed switch 12. In the present case, reed switch 12 is disposed below second end 8 of contact strand 6 in receiving means 10 in the displacement direction of second end 8 of contact strand 6.

Contact strand 6 is disposed tangentially to a contact circumference of shaft 20 in frame support 2. In this context, a contact surface is formed between contact strand 6 and the contact circumference of shaft 20 when contact strand 6 is in a contact position. Contact strand 6 is a strand and has a fiber arrangement composed of a plurality of carbon fibers. Alternatively, contact strand 6 can be a cord.

For reinforcing, frame carrier 2 comprises a reinforcement which is formed as reinforcing plates 15, 16 in the area of each of its corners. A cable routing 17 is assigned to first end 7 of contact strand 6. Furthermore, a cable routing 18 which is disposed on reed switch 12 is formed on second end 8 of contact strand 6.

On second end 7, contact strand 6 is guided at least partly through second leg 4 of frame support 2 into receiving means 10. Receiving means 10 is disposed externally on second leg 4 of frame support 2. In this context, receiving means 10 engages at least partly around frame support 2.

Furthermore, discharge device 1 has an optical or acoustic means 13 which is connected to reed switch 12. Means 13 is configured so as to be triggered as a result of an activation of reed switch 12.

FIG. 3 shows a Detail B of FIG. 2. Second end 8 of contact strand 6 is guided through an opening 5 of second leg 4 of frame support 2. Second end 8 extends at least in sections into a cavity 11 of receiving means 10. Second end 8 which extends at least partly into receiving means 10 is magnetic. In this context, a magnet 9 is disposed on the front end of second end 8 of contact strand 6. Reed switch 12 is adhesively bonded or pressed into receiving means 10.

As a result of the wear of contact strand 6, the magnetic second end 8 of contact strand 6 can move away from reed switch 12, meaning it can be displaced, causing switch 12 to open. In other words, a magnetic field moving away from reed switch 12 opens reed switch 12. As a result of this, reed switch 12 is triggered or activated.

As a result of reed switch 12 opening, a visual or acoustic signal can be generated by means of means 13 shown in FIG. 2. This signal informs the operating personnel that the initial cross-sectional area of the contact strand has been reduced to at least 50%. Thus, replacement of discharge device 1 or contact strand 6 of discharge device 1 can be initiated.

FIG. 4 shows the cross section A-A of FIG. 2. As mentioned above, second end 8 of contact strand 6 is guided through an opening 5 of second leg 4 of frame support 2. In this context, opening 5 is an oblong hole. As a result of this, a vertical displacement of second end 8 of contact strand 6 can be achieved.

In the shown starting position of contact strand 6, second end 8 is in contact with a first side of opening 5 of second leg 4, said opening 5 being formed as an oblong hole. In this position, no wear has occurred on contact strand 6. When reaching an end position, contact strand 6 has been displaced such that it is in contact with a second side of opening 5 of second leg 4 (not shown), said second side being disposed opposite the first side.

In the end position, contact strand 6 shows signs of wear which require replacing contact strand 6 or discharge device 1. As mentioned above, reed switch 12 can thus be activated as a result of a reduction of the initial cross-sectional area of contact strand 6 to at least 50%. Because of the geometric embodiment of opening 5, the displacement path of second end 8 within opening 5 can easily be set.

In order to maintain the contact between shaft 20 and discharge device 1, a means (not shown) which is configured so as to apply a tension or compression force to frame support 2 in the direction of shaft 20 can additionally be provided. Said means is a tension spring which can engage on frame carrier 2, for example.

It is easily possible to activate reed switch 12 as a result of a displacement of contact strand 6, said displacement being caused by a wear of said contact strand 6. As a result of this, it can easily be detected promptly when a defined wear of the contact strand of the discharge device is reached.

The invention claimed is:

1. A discharge device (1) for discharging electrostatic charges from a shaft (20), the discharge device (1) comprising:
   a frame support (2) having a first leg (3) and a second leg (4) and a contact strand (6) for forming a contact surface with the shaft (20), a first end (7) of the contact strand (6) being clamped on the first leg (3) and a second end (8) of the contact strand (6) being mounted so as to be displaceable on the second leg (4),
   a receiver (10) which is disposed on the frame support (2), the second end (8) of the contact strand (6) extending at least partly into the receiver (10), and
   a reed switch (12), disposed in the receiver (10) or in the contact strand (6) and which is configured so as to be activated as a result of a displacement of the second end (8) of the contact strand (6), said second end (8) extending at least partly into the receiver (10),
   wherein the second end (7) of the contact strand (6) is displaceable in the receiver (10) relative to the longitudinal extension of the second leg (4).

2. The discharge device (1) according to claim 1, wherein the second end (8) which extends partly into the receiver (10) has a magnetic area when the reed switch (12) is disposed in the receiver (10).

3. The discharge device (1) according to claim 1, wherein the receiver (10) has a magnetic area when the reed switch (12) is disposed in the second end (8) of the contact strand (6) which extends partly into the receiver (10).

4. The discharge device (1) according to claim 1, wherein the discharge device (1) has an optical or acoustic generator (13) which is connected to the reed switch (12), said optical or acoustic generator (13) configured to be triggered as a result of an activation of the reed switch (12).

5. The discharge device (1) according claim 1, wherein the second end (8) of the contact strand (6) is guided through an opening (5) of the second leg (4) of the frame support (2).

6. The discharge device (1) according to claim 5, wherein the opening (5) is an oblong hole.

7. The discharge device (1) according to claim 5, wherein the contact strand (6) is in contact with a first side of the opening (5) of the second leg (4) when in a starting position and in contact with a second side of the opening (5) of the second leg (4) when in the end position.

8. The discharge device (1) according to claim 1, wherein the reed switch (12) is configured so as to be activated as a result of a reduction of the initial cross-sectional area of the contact strand (6) to at least 50%.

9. The discharge device (1) according to claim 1, wherein the receiver (10) is disposed externally on the second leg (4) of the frame support (2).

10. The discharge device (1) according to claim 1, wherein the receiver (10) engages at least partly around the frame support (2).

11. The discharge device (1) according to claim 1, wherein the reed switch (12) is adhesively bonded or pressed into the receiver (10).

12. The discharge device (1) according to claim 1, wherein the reed switch (12) adhesively bonded, pressed or woven into the contact strand (6).

13. The discharge device (1) according to claim 1, wherein the discharge device (1) is configured to apply a force to the frame support (2) in the direction of the shaft (20).

14. A device having a shaft (20) and a discharge device (1) according to claim 1.

* * * * *